United States Patent [19]

Marchisio

[11] Patent Number: 4,465,170
[45] Date of Patent: Aug. 14, 1984

[54] CLUTCH MECHANISM FOR TWO-PLATE CLUTCHES SUITABLE FOR AUTOMOTIVE VEHICLES

[75] Inventor: Aldo Marchisio, Moncalieri, Italy
[73] Assignee: Valeo SA, Paris, France
[21] Appl. No.: 314,990
[22] Filed: Oct. 26, 1981

[30] Foreign Application Priority Data

Oct. 24, 1980 [FR] France .............................. 80 22766

[51] Int. Cl.³ .................. F16D 21/08; F16D 13/22; F16D 13/48
[52] U.S. Cl. ................................. 192/48.7; 192/48.8; 192/70.21; 192/70.29; 192/89 B
[58] Field of Search ............... 192/48.7, 48.8, 70.21, 192/70.27, 70.29, 70.30, 89 B, 99 A; 403/DIG. 6

[56] References Cited

U.S. PATENT DOCUMENTS

| | | | |
|---|---|---|---|
| 3,021,931 | 2/1962 | Holz | 192/70.3 |
| 3,785,466 | 1/1974 | Murai et al. | 192/70.27 |
| 4,131,185 | 12/1978 | Schall | 192/89 B |
| 4,210,232 | 7/1980 | Beccaris | 192/70.29 |
| 4,236,620 | 12/1980 | Beccaris | 192/48.8 |

FOREIGN PATENT DOCUMENTS

| | | | |
|---|---|---|---|
| 1946126 | 4/1971 | Fed. Rep. of Germany | 192/70.3 |
| 2226037 | 11/1974 | France . | |
| 2374557 | 7/1978 | France . | |

Primary Examiner—Rodney H. Bonck
Assistant Examiner—David D. House
Attorney, Agent, or Firm—Charles E. Brown

[57] ABSTRACT

In a clutch mechanism for two-plate clutches suitable for automotive vehicles, two pressure plates are continuously acted on by respective Belleville type annular springs which bear axially on a common annular spacer keyed to the skirt of the reaction plate. This annular spacer comprises a slotted ring engaging in a groove in the skirt. The mechanism is primarily but not exclusively applicable to clutches of the type having two independent outputs.

6 Claims, 8 Drawing Figures

CLUTCH MECHANISM FOR TWO-PLATE CLUTCHES SUITABLE FOR AUTOMOTIVE VEHICLES

BACKGROUND OF THE INVENTION

1. Field of the Invention

The present invention concerns clutches incorporating two friction disks, of both the "dual clutch" type with two outputs in which each friction disk is keyed against rotation on a separate driven shaft, and the single-output "two-plate" clutch in which both friction disks are keyed against rotation on the same driven shaft.

The invention is more particularly concerned with the mechanism for such a clutch, that is to say with the component parts which, including a friction disk, are assembled, in practice in the form of a self-contained unit, on a reaction plate (or flywheel) with an interposed friction disk.

Such a clutch mechanism, for which a particular application is to automotive vehicles, generally comprises a first plate, hereinafter referred to as the reaction plate, and, on the same side of said reaction plate and movable axially relative thereto, a friction disk and two other plates, hereinafter referred to as pressure plates. The side of the reaction plate referred to is that on which the mechanism is mounted on a second reaction plate or flywheel. Respective annular springs act continuously on said pressure plates so as to urge one towards the reaction plate, to clamp the friction disk, and the other in the opposite direction.

The invention is more particularly concerned with mechanisms in which these annular springs are of the Belleville type, conjointly bearing on an annular spacer which is keyed against relative motion relative to the reaction plate.

2. Description of the Prior Art

This type of clutch mechanism is disclosed in U.S. Pat. No. 3,021,931. The clutch mechanism disclosed in French patent application No. 77 21605 published under No. 2 397 563 is also of this type.

In U.S. Pat. No. 3,021,931 the annular spacer on which the annular springs bear is an annular member forming part of a skirt by virtue of which the reaction plate defines the volume within which the pressure plates move. Consequently the skirt is not of unitary construction and is of considerable thickness.

As a result the assembly is somewhat complicated and relatively large in the axial direction.

In French Pat. No. 2 397 563 the annular spacer on which the annular springs bear is a simple ring separate from the reaction plate and freely engaged in the skirt of the latter. Consequently the skirt may be of unitary construction. The ring is stacked axially with the annular springs, between the latter, and keyed against axial movement relative to the reaction plate through one of the annular springs, by virtue of the latter bearing on a transversely disposed shoulder on the skirt of the reaction plate.

Although this arrangement is satisfactory, it has the disadvantage that it is not suited to the standardized manufacture of clutch mechanisms of the same basic type but with different characteristics, in particular clutch mechanisms fitted with annular springs of different thicknesses.

In these clutch mechanisms, the height of the stack formed by the annular springs and the ring separating them is strictly limited by the shoulder on which one of the annular springs bears and by segments projecting radially from the reaction plate skirt, disposed opposite the shoulder on the latter and retaining the other annular spring.

Thus if it is required to fit thicker annular springs, the thickness of the ring separating them must be reduced.

This ring must have at least a defined minimum thickness to permit appropriate action of the annular springs on changing from the engaged to the disengaged configuration of the clutch, however.

This therefore imposes a limit on the range of thicknesses which may be used for the annular springs.

The object of the present invention is to provide an arrangement which overcomes these disadvantages and which thus favors standardized manufacture.

SUMMARY OF THE INVENTION

The present invention consists in a clutch mechanism for a two-plate friction clutch suitable for use in an automotive vehicle, comprising a reaction plate, on the same side of said reaction plate and movable axially relative thereto a friction disk and two pressure plates, respective Belleville type annular springs acting continuously on said pressure plates so as to urge one towards said reaction plate and the other in the opposite direction, a member immovable in the axial direction relative to said reaction plate and formed with a groove, and an annular spacer in the form of a slotted ring which engages in said groove, is immovable in the axial direction relative to said reaction plate and on which said annular springs bear.

This arrangement makes it possible to maintain a guard space within the reaction plate skirt, which may be of unitary construction, between the groove which receives the ring forming the annular spacer in accordance with the invention and which is formed in a cylindrical surface machined on said skirt, and the transversely disposed shoulder defining said cylindrical surface in said skirt.

This guard space is then available for fitting annular springs of different thicknesses, if required.

Thus the principal component parts of the clutch mechanism in accordance with the invention are suitable for the economic implementation of clutch mechanisms of differing characteristics, distinguished primarily by annular springs of different thicknesses.

The ring forming the annular spacer in accordance with the invention is elastically deformable in the radial direction between a deployed position in which it engages in said groove and a retracted position in which it can disengage from said groove, the mechanism preferably further comprising blocking means for maintaining said ring in the deployed position in which it engages in said groove.

This considerably enhances the security of the assembly.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

The drawings show the application of the invention to a clutch mechanism suitable for use in a dual clutch, that is to say a clutch with two independently controllable outputs, controlling two separate driven shafts independently from a common driving shaft.

The clutch mechanism comprises, transversely disposed, a first plate 10A, hereinafter referred to as the reaction plate, and, on the same side of the reaction plate 10A and movable axially relative thereto, a friction disk 11A and two other plates 12A, 12B, hereinafter referred to as pressure plates.

Reaction plate 10A and pressure plates 12A, 12B are generally annular. Friction disk 11A is supported on a hub 13A which can be keyed to a first driven shaft (not shown).

At its external periphery reaction plate 10A carries an annular skirt 15 surrounding pressure plates 12A, 12B and extending beyond plate 12B in the axial direction.

In practice skirt 15 is formed with large apertures so that it is basically constituted by a ring 16 connected to reaction plate 10A, with which it is integral, by generally L-shaped arms 17 between which are large spaces 18.

Figure 3:
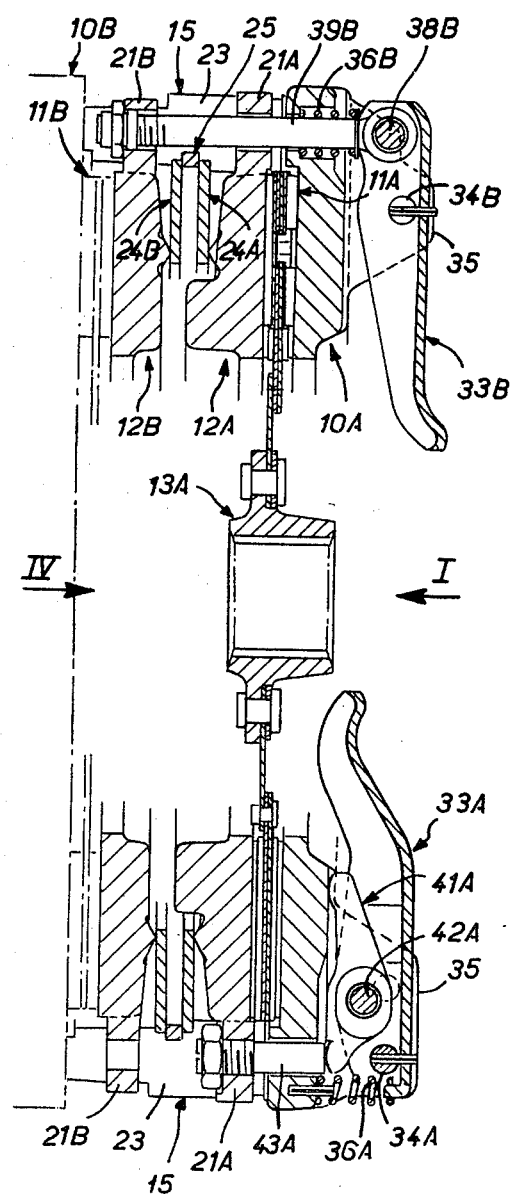
FIG. 3 is an axial cross-section on the line III—III in FIG. 1.

As shown schematically in dashed line in FIG. 3, skirt 15 of reaction plate 10A adapts the clutch mechanism in accordance with the invention for fitting on to a second reaction plate or flywheel 10B keyed to a driving shaft (not shown) with a second friction disk 11B disposed between them.

Axial bores 20 are formed in skirt 15 of reaction plate 10A, in line with the spaces 18 in the latter, for bolts which attach the assembly to reaction plate 10B.

Pressure plates 12A, 12B are constrained to rotate with reaction plate 10A.

Figure 1:
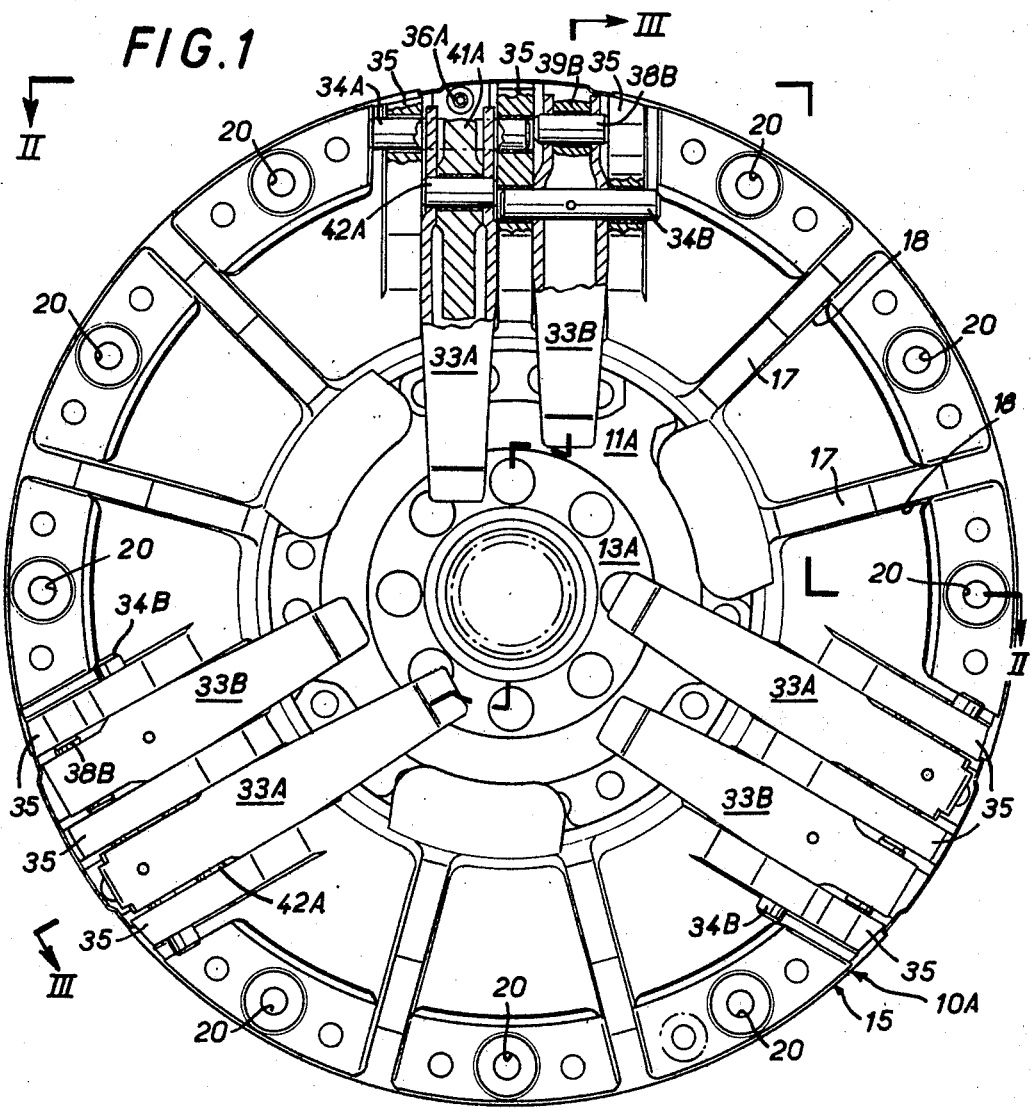
FIG. 1 is a partially cut-away view in elevation of a clutch mechanism in accordance with the invention, as seen along the arrow I in FIGS. 2 and 3.
Figure 2:
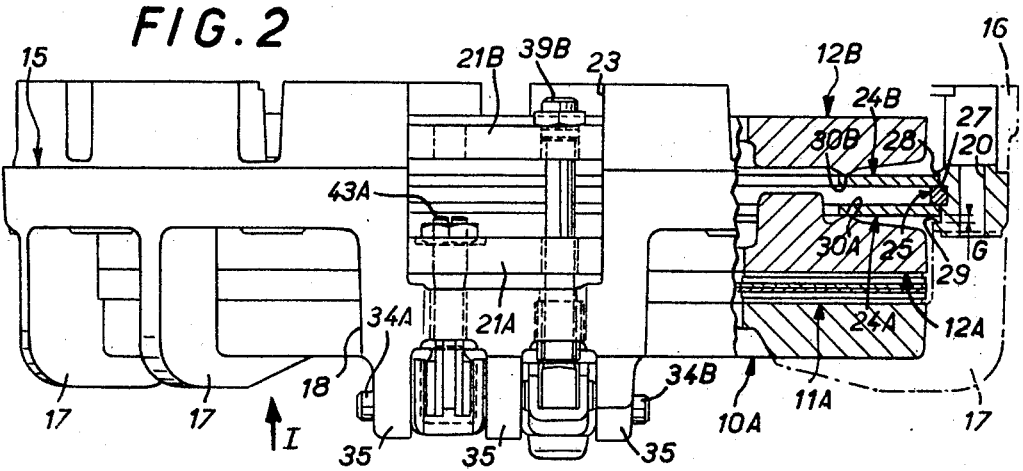
FIG. 2 is a partial cross-section in plan view on the line II—II in FIG. 1.

To this end, each is formed with respective radial lugs 21A, 21B, of which there are three in the embodiment shown. These move axially in openings 23 in skirt 15 (FIGS. 2 and 3).

Such arrangements are well known in the art and as they do not constitute part of the present invention, they will not be further described here.

Pressure plates 12A, 12B are continuously acted on by respective Belleville type annular springs 24A, 24B which urge one towards reaction plate 10A, to clamp friction disk 11A against reaction plate 10A, and the other in the opposite direction, to clamp friction disk 11B against reaction plate 10B. These annular springs bear conjointly and in the axial direction on a common annular spacer 25 which is keyed against axial movement relative to reaction plate 10A.

Figure 4:
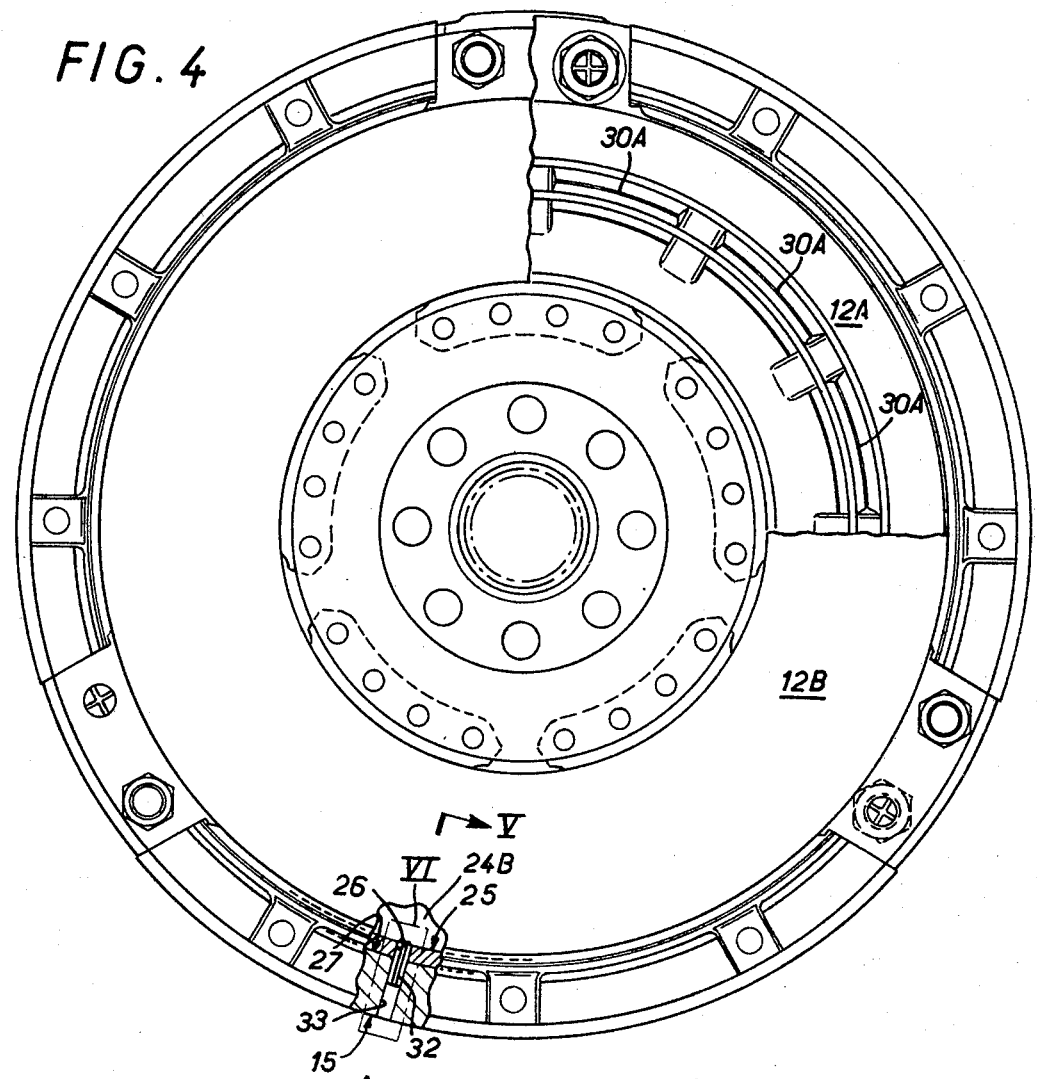
FIG. 4 is a partially cut-away view in elevation, as seen on the arrow IV in FIG. 3.

In accordance with the invention, annular spacer 25 comprises a ring formed with a slot 26 (FIGS. 4, 6 and 7) and which engages in a groove 27 in a member keyed against axial movement relative to reaction plate 10A (in practice, in skirt 15 carried by reaction plate 10A and more precisely in a cylindrical surface 28 on the latter), appropriately machined to receive annular springs 24A, 24B.

In the embodiment shown in FIGS. 1 to 7, the ring which forms annular spacer 25 is of substantially rectangular shape in radial cross-section, in practice substantially square.

In the transverse direction, it forms two shoulders facing in opposite senses along the axial direction, on one of which bears annular spring 24A and on the other of which bears annular spring 24B.

Figure 7:
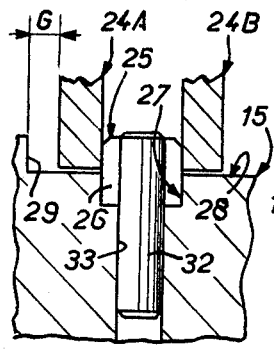
FIGS. 6 and 7 show details of FIGS. 4 and 5 to a larger scale, as indicated at VI-VII on those Figures.
Figure 5:
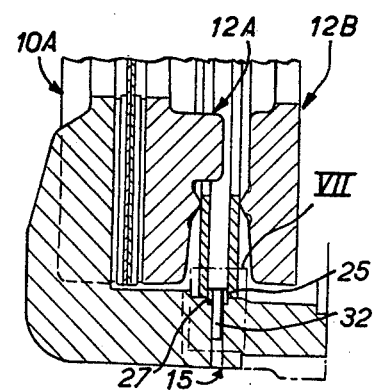
FIG. 5 is a partial axial cross-section on the line V—V in FIG. 4.

Internally of skirt 15 a transverse shoulder 29 defines the machined cylindrical surface 28. The distance between this shoulder 29 and groove 27 is made sufficiently great to substantially exceed the maximum possible thickness of the corresponding annular spring 24A, so that there always exists in the axial direction a guard space G between shoulder 29 and annular spring 24A (FIGS. 2, 5 and 7).

The outer perimeters of annular springs 24A, 24B bear on annular spacer 25.

Their inner perimeters bear on pressure plates 12A, 12B which are formed with respective circular bosses 30A, 30B.

In practice, the ring forming annular spacer 25 in accordance with the invention, which may be of metal, for example, is relatively flexible and is thus elastically deformable in the radial direction between a deployed configuration, constituting its normal rest configuration in which, as shown, it is actually engaged in the associated groove 27 in skirt 15 carried by reaction plate 10A, and a retracted configuration in which it can disengage from groove 27.

In accordance with the invention, blocking means are preferably provided to maintain this ring in the deployed configuration in which it is engaged in groove 27.

In the embodiment shown in FIGS. 1 to 7, these blocking means comprise a pin 32 inserted in a radial bore 33 in skirt 15 and radially engaged in slot 26 of the ring forming annular spacer 25.

As shown, the pin may be, for example, of the type posessing radial elasticity and as sold under the Trade Mark "MECANINDUS."

Figure 6:
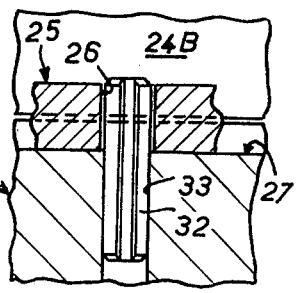

Pin 32 occupies at least part of slot 26 in the ring forming annular spacer 25, sufficient to oppose return of this ring to its rest configuration. Allowing for manufacturing tolerances, the two ends of the ring in its rest configuration are not necessarily in contact with pin 32, so that there may be clearance between the aforementioned ends and the pin, as shown in FIG. 6.

On the side opposite pressure plates 12A, 12B reaction plate 10A carries operating levers 33A, 33B pivoting on spindles 34A, 34B in bosses 35 on reaction plate 10A against the resisting force of return springs 36A, 36B.

There are three operating levers 33A in the embodiment shown and three operating levers 33B. They extend substantially radially of the assembly and are grouped in pairs in line with radial lugs 21A, 21B on pressure plates 12A, 12B. Each of said pairs comprises an operating lever 33A and an operating lever 33B.

Coupled directly to each operating lever 33B by means of a spindle 38B is a link 39B extending in a substantially axial direction and passing with clearance through corresponding radial lug 21A of pressure plate 12A. It is coupled to the corresponding radial lug 21B of pressure plate 12B. In practice each link is self-blocking, carrying a nut which bears on the respective radial lug 21B of pressure plate 12B.

Each of the operating levers 33A is connected to pressure plate 12A only through an intermediate lever 41A bearing on reaction plate 10A.

In the embodiment shown, each intermediate lever 41A is pivoted at its approximate center on a pin 42A on the associated operating lever 33A.

Its inner end bears on reaction plate 10A. Its outer end bears on a pushrod 43A extending substantially parallel to the axis of the assembly, the other end of which is attached to the corresponding radial lug 21A of pressure plate 12A.

It will therefore be appreciated that the assembly of the clutch mechanism thus constituted mainly consists in the axial stacking of the various component parts, the annular spacer 25 being inserted after stacking friction disk 11A, pressure plate 12A and annular spring 24A, before stacking annular spring 24B and pressure plate 12B.

The thickness of annular springs 24A, 24B depend on the characteristics required.

As previously indicated, variation in the thickness of annular springs 24A, 24B is allowed for by the guard space G formed for this purpose.

Where necessary, it is sufficient to machine down bosses 30A, 30B on pressure plates 12A, 12B on which annular springs 24A, 24B bear to the extent appropriate to the thickness of these springs.

In operation, friction disk 11A is normally clamped between pressure plate 12A and reaction plate 10A, under the action of annular spring 24A. Conjointly, friction disk 11B is normally clamped between pressure plate 12B and reaction plate 10B under the action of annular spring 24B.

In this case both outputs of the dual clutch are engaged.

To disengage one or both clutch outputs either or both release bearings (not shown) are brought into contact with the free end of the respective operating levers 33A, 33B.

In the case of operating levers 33A, it will be seen that the transmission of force between an operating lever 33A and the associated intermediate lever 41A is through a pin, which enhances the efficiency of transmission as friction is reduced by this means in that part of the assembly subject to the heaviest loads.

Also, intermediate lever 41A advantageously bears on a flat area of reaction plate 10A.

Figure 8:
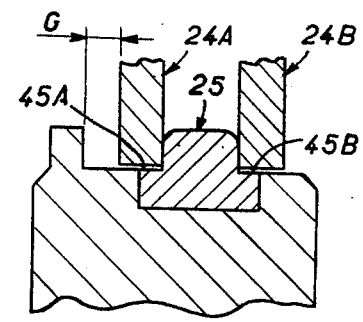
FIG. 8 is a view analagous to that of FIG. 7, relating to an alternative embodiment.

In the embodiment shown in FIG. 8 the blocking means for maintaining the slotted ring forming annular spacer 25 in the deployed position comprises two cylindrical surfaces 45A, 45B radially set back respectively from annular springs 24A, 24B, by virtue of which the ring is able to abut radially against annular springs 24A, 24B.

In other words, as seen in radial cross-section the ring forming annular spacer 25 is generally T-shaped.

As the branches of the T bear against annular springs 24A, 24B it is prevented from returning to its retracted configuration.

In the embodiments shown these cylindrical surfaces 45A, 45B are continuous in the circumferential direction.

This is not mandatory and they may instead be circumferentially discontinuous.

It will be understood that various changes in the details, materials and arrangements of parts, which have been herein described and illustrated in order to explain the nature of the invention, may be made by those skilled in the art within the principle and scope of the invention as expressed in the appended claims.

Moreover, although the invention is preferentially applied to clutches with two independent outputs, it is equally applicable to clutches with a single output.

Thus the invention relates generally to clutches incorporating two friction disks.

I claim:

1. A clutch mechanism for an automotive friction clutch of the type having two friction disks, said clutch mechanism comprising a reaction plate, a friction disk and two pressure plates arranged axially on one side of said reaction plate and axially movable with respect thereto, two Belleville type annular springs, one of said annular springs constantly urging said one of said pressure plates toward said reaction plate and the other of said annular springs constantly urging the other of said pressure plates away from said reaction plate, an annular member fixed axially relative to said reaction plate and having a radially inwardly opening annular groove, an annular spacer member defined by a split ring, said annular spacer member being received in and axially fixed by said groove, said annular springs bearing against axially spaced portions on said annular spacer member, said annular spacer being elastically radially deformable between a deployed position for engagement in said groove and a retracted position for removal from said groove, and blocking means for maintaining said annular spacer in its deployed position.

2. A clutch mechanism according to claim 1, wherein said blocking means comprise a pin radially inserted in said groove between free ends of said annular spacer member.

3. A clutch mechanism according to claim 1, wherein said blocking means comprises two cylindrical surfaces provided on said annular spacer member opposite to and radially set back from the outer peripheral edges of the respective annular springs, said bearing surfaces being adapted to abut against the respective peripheral edges of said annular springs to prevent the return of said annular spacer member to its retracted position.

4. A clutch mechanism according to claim 3, wherein said cylindrical surfaces are circumferentially discontinuous.

5. A clutch mechanism according to claim 1, wherein an annular guard space is provided in said annular member between said groove receiving said annular spacer member and a radial shoulder on said annular member axially spaced from said groove, said guard space being adapted to accommodate the corresponding annular spring of any desired thickness.

6. A clutch mechanism according to claim 5, wherein said annular member comprises a skirt extending to said one side of said reaction plate.

* * * * *